(12) United States Patent
Ali

(10) Patent No.: US 7,107,139 B2
(45) Date of Patent: Sep. 12, 2006

(54) SPEED CONTROL DEVICE AND COUNTER FOR A MOTOR VEHICLE

(76) Inventor: Farrag Abdelkarim Ali, 29150 Alsafat, 13152 (KW)

(*) Notice: Subject to any disclaimer, the term of this patent is extended or adjusted under 35 U.S.C. 154(b) by 262 days.

(21) Appl. No.: 10/659,365

(22) Filed: Sep. 11, 2003

(65) Prior Publication Data

US 2005/0060083 A1 Mar. 17, 2005

(51) Int. Cl.
*B60T 8/32* (2006.01)
*B60K 23/00* (2006.01)

(52) U.S. Cl. ...................... 701/93; 74/515 R
(58) Field of Classification Search ............ 701/36, 701/93, 94; 180/170, 171; 340/424.5, 438, 340/439; 74/515 R, 562
See application file for complete search history.

(56) References Cited

U.S. PATENT DOCUMENTS

| | | | |
|---|---|---|---|
| 2,084,932 A | 6/1937 | Allen | |
| 2,212,083 A | 8/1940 | Stephens | |
| 2,221,274 A | 11/1940 | Taylor | |
| 2,224,276 A | 12/1940 | Salem | |
| 2,239,155 A | 4/1941 | Levich | |
| 3,561,393 A | 2/1971 | Fortson | |
| 3,603,170 A | 9/1971 | Yamauchi | |
| 4,324,309 A * | 4/1982 | Ginley | 180/316 |
| 4,561,527 A * | 12/1985 | Nakamoto et al. | 192/219.4 |
| 4,827,857 A | 5/1989 | Fieschi et al. | |
| 5,107,997 A | 4/1992 | Worsley | |
| 5,544,600 A | 8/1996 | Hunt | |
| 5,813,989 A * | 9/1998 | Saitoh et al. | 600/484 |
| 6,167,776 B1 | 1/2001 | Cossette | |
| 6,237,711 B1 | 5/2001 | Hunt | |

* cited by examiner

*Primary Examiner*—Matthew Luu
(74) *Attorney, Agent, or Firm*—Lowe Hauptman & Berner

(57) ABSTRACT

A speed control device and counter for a motor vehicle includes an auxiliary accelerator member and a plurality of counters for analyzing the driving habits of an individual. The auxiliary accelerator member is moveable between an operational and an inactive position and is adapted to engage the calf, knee or thigh of a driver in its operational position. The speed control device may also incorporate a drive-by-wire principal of operation.

5 Claims, 4 Drawing Sheets

SPEED CONTROL DEVICE AND COUNTER FOR A MOTOR VEHICLE

FIELD OF THE INVENTION

The present invention relates to a speed control device and counter for a motor vehicle and more particularly a speed control device having an auxiliary accelerator.

BACKGROUND OF THE INVENTION

Auxiliary accelerator controls for motor vehicles are known. For example, a U.S. Patent of Allen (U.S. Pat. No. 2,084,932) discloses an auxiliary accelerator control for automotive vehicles that allows a driver of a vehicle to use their left foot in the operation of the accelerator at times to reduce the fatigue of constantly driving the vehicle with the right foot. A knee control for acceleration is disclosed in the U.S. Patent of Taylor (U.S. Pat. No. 2,221,274). As disclosed therein, a knee control may be operatively connected with the foot control of a conventional accelerator in which the knee control is so designed as to permit knee or foot operation. As disclosed, the knee control is shiftable to inoperative position in additional to embodying adjustment to satisfy the needs of a particular driver.

It is presently believed that there may be a commercial demand for an improved speed control device and counter for a motor vehicle in accordance with the present invention. Such devices are operatively connected to a fuel control for increasing and decreasing the flow of fuel to thereby increase or decrease the speed of the vehicle. The devices also provide for foot, calf, knee or thigh operation to control the flow of fuel to reduce the fatigue from driving long distances with the right foot in a relatively stationary position. In addition, the devices in accordance with the present invention also overcome the reluctance of many drivers to use a conventional speed control device because of an apparent lack of direct control of the vehicle speed.

Additional advantages of the device in accordance with the present invention reside in the foot activated mechanism for bringing a first speed control member into contact with a drivers calf, knee or thigh which allows a driver to engage the speed control member without removing their hands from the steering wheel.

A still further advantage of the invention resides in the use of one or more counters to indicate the number of times the speed of the vehicle is increased. A second and third counter may also be provided to indicate the number of times the speed of the vehicle is increased by a conventional accelerator pedal and a number of times the brake pedal is depressed. These counters can then be used to diagnose and overcome poor driving habits such as pumping the gas pedal or auxiliary fuel control as opposed to a smooth, even or more economic supply of fuel to the engine and overuse of the brake pedal. The counters may also be used as an indicator of when to rotate and replace tires and brake pads.

In addition to the above, it is presently believed that the device in accordance with the present invention can be manufactured and sold at a reasonable cost, can be readily installed, are durable and readily serviceable.

BRIEF SUMMARY OF THE INVENTION

In essence, the present invention contemplates a speed control device and counter for a motor vehicle. The device includes a first control member which is moveable between an activated or operational position and an inactivated position wherein the first control member is not used in the operation of a motor vehicle. In its activated position, the first control member is in contact with a portion of an individual's leg when the individual is seated behind the steering wheel of the vehicle. The device also includes separate activation means as for example by a small pedal or switch in the floor of the motor vehicle for moving the first control means into or out of its inactivated position and out of its activated position in contact with the leg of the individual. Additional means are also provided for adjusting the portion of the first member to engage the calf, knee or thigh of the individual. Means such as a mechanical linkage or servo controller for a "drive by wire" operational system is also provided for increasing or decreasing the speed of the motor vehicle in response to the lateral movement of the first member. A counter for indicating the number of times the speed of the vehicle has been increased by the lateral movement of the first control member is also provided. The device also includes a counter for indicating the number of times the speed of the vehicle has been increased by the lateral movement by the first control means.

In a preferred embodiment of the invention the device also includes a separate foot operated fuel control member for increasing and decreasing the flow of fuel in response to foot pressure and a counter for indicating the number of times the flow of fuel has been increased by the foot activated fuel control member. The preferred embodiment of the invention also contemplates the use of a third counter to indicate the number of times a brake pedal has been depressed. It is believed that the three counters may be useful in analyzing driving techniques such as frequent changes in fuel control, excess use of the brakes, fuel economy as well as the time to rotate tires, replace tires, replace brake pads etc. The invention will now be described in connection with the accompanying drawings wherein like number have been used to indicate like parts.

DESCRIPTION OF THE PREFERRED EMBODIMENTS

The speed control device having an auxiliary fuel control and counter will now be described in connection with the accompanying drawings. The auxiliary fuel control allows the driver of the vehicle to use the left or right knee, thigh or calf in order to increase or decrease the speed of a motor vehicle. In this way, the driver can reduce fatigue and cramping of the right foot during long trips. The speed control device also includes a plurality of counters and meters for displaying and recording the number of times an accelerator, auxiliary fuel control and brakes are used during the operation of a motor vehicle. The meters also include reset buttons to analyze data over a particular trip or time period and review the driving techniques.

In a preferred embodiment of the invention, the speed control device and counter incorporate a drive-by-wire system. However, it should be recognized that more conventional mechanical linkage can be used in carrying out the invention. Such linkage is conventional and clearly within the skill of a person of ordinary skill in the art. Accordingly, a detailed description is not included herein.

The drive-by-wire control system described herein is similar in concept to the "fly-by-wire" system as used in some commercial aircraft. The systems use wires and servo motors and a command wire to control aircraft throttles, flaps and the like. However, in the present invention, servo motors are used to advance and retard the throttle to increase and decrease the speed of the vehicle and to move an auxiliary fuel control device into and out of an active and passive position. The specifics of such system are well within the skill of one of ordinary skill in the art.

Figure 1:
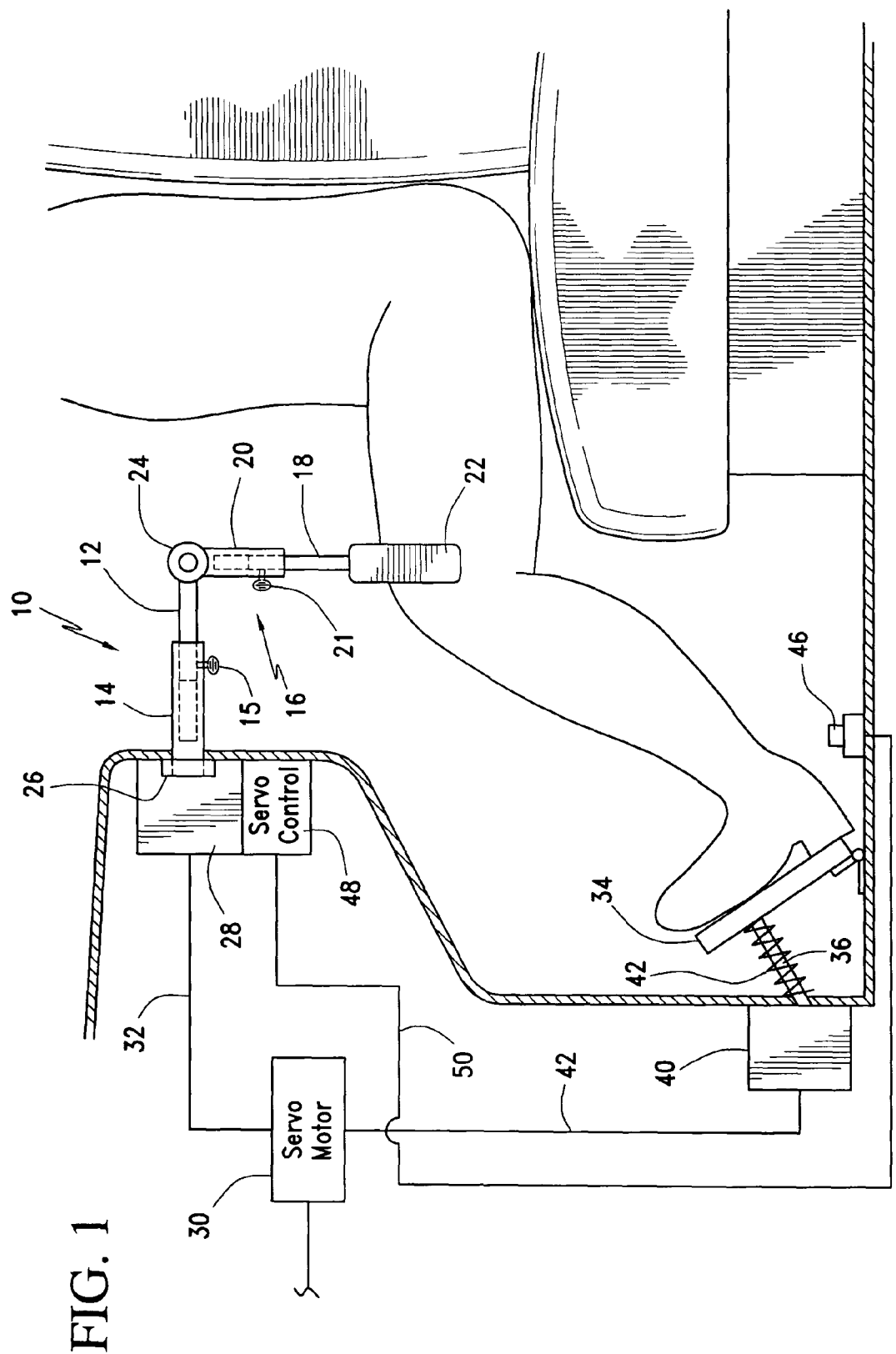
FIG. 1 is a schematic elevational view which illustrates one embodiment of the invention.

Referring to FIG. 1, an auxiliary fuel control device 10 includes an adjustable rod 12 which is disposed in a tubular member 14 in sliding engagement therewith. The rod 12 is moveable longitudinally within the tubular member 14 for adjusting the position of an auxiliary fuel control element 16. The portion of the rod 12 with respect to the tubular member 14 may be fixed or released by fixing means such as screw 15.

The auxiliary fuel control element 16 also includes a rod 18 slidably disposed in a tubular member 20. The control 16 also includes a leg engaging member 22 which is attached to one end of the rod 18 for engaging the thigh, knee or calf of a individual. The position of the engaging member 22 is adjusted by sliding the rod 18 in an inward or outward direction within a tubular member 20 and fixing the rod in a selective position by screw 21. The member 22 can be further adjusted by a swivel joint 24 which has sufficient friction resistance to maintain the member 22 in a selected position. Any suitable means such as a U shaped element, not shown, can be used to position and maintain the fuel controlled device on the leg, knee or thigh of the driver.

Movement of the knee, thigh or calf of a driver moves the member 22 in a lateral direction which rotates the rod 12 and tubular member 14 to increase or decrease the flow of fuel to thereby increase or decrease the speed of the vehicle. Biasing means 26 such as a bearing and spring assembly bias is the rotational movement of the tubular member 14 in a direction that will reduce the flow of fuel to the engine (not shown) in the same manner as a spring under a floor mounted accelerator pedal.

A first signal generator 28 having mechanical input means and electrical output means generates a signal in response to the rotation of the tubular member 14. The signal through a wire 32 to activate a servo motor 30 to thereby increase or decrease the flow of fuel to the engine. It is also contemplated that a simple mechanical linkage which is well within the skill of a person of ordinary skill in the art could be used in place of the signal generator, wire and servo motor.

As illustrated in FIG. 1, a conventional accelerator pedal 34 moves a rod 36 into and out of the second signal generator 40. The accelerator pedal 34 is biased to reduce the flow of fuel to the engine by a spring 42 in a conventional manner. As the pedal is depressed or released, the rod 36 moves into or outward from the signal generator 40. The signal generator 40 also includes a mechanical input means and electrical output means like the first signal generator 28 but produces an electrical signal and response to the longitudinal movement of the rod 36. The electrical signal from the second signal generator 40 passes through a wire 42 to activate the servo motor 30 to increase or decrease the speed of the vehicle.

Figure 4:
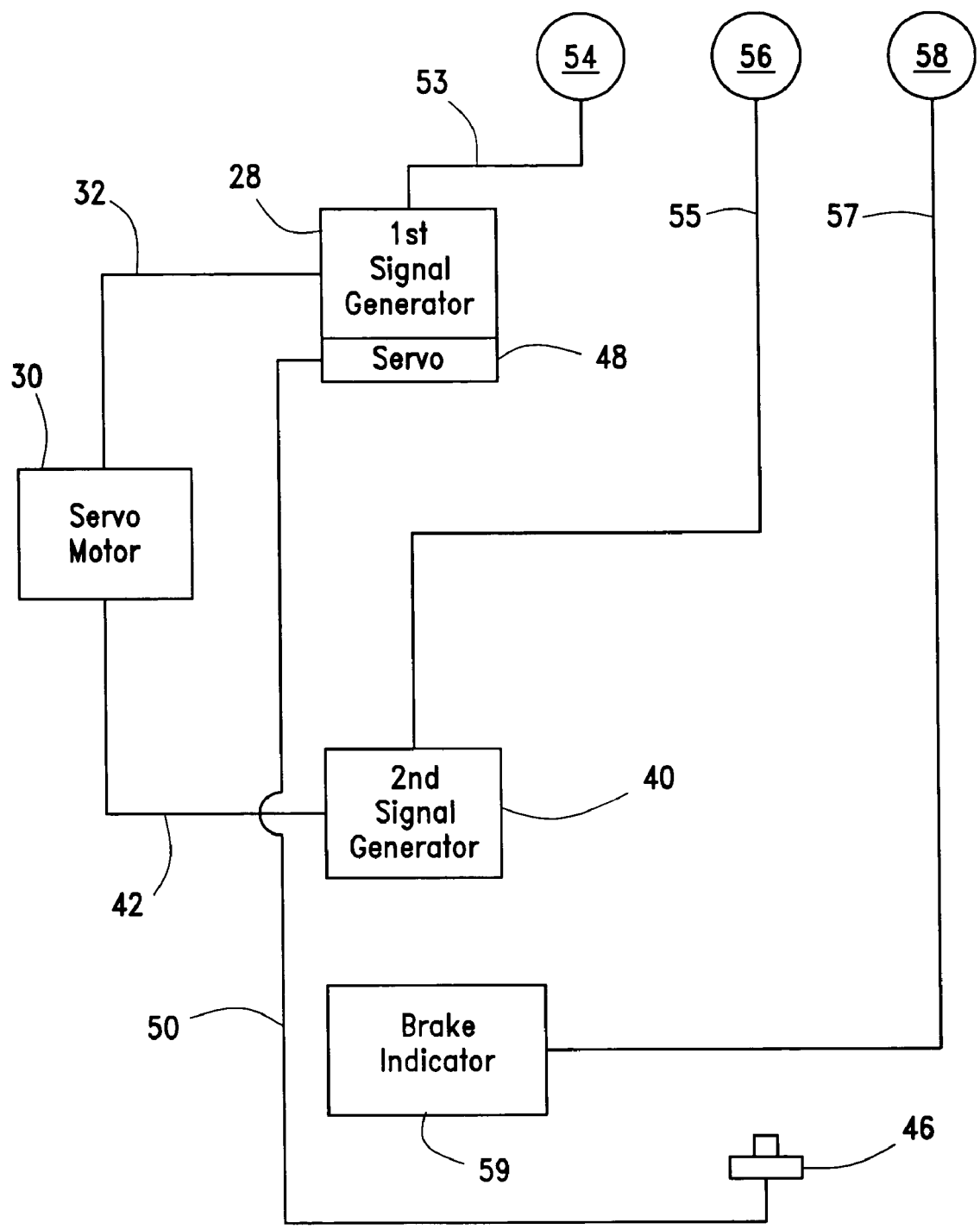
FIG. 4 is a wiring diagram for a device for a drive-by-wire system for use in practicing the present invention.

As illustrated in FIGS. 1 and 4, a foot operated switch 46 may be used to move the fuel control device 10 to a passive out of the way or inactive position. For example, depressing the foot operated switch 46 sends a signal to a servo controller 48 by means of a wire 50 so that the servo controller 48 moves the fuel control device 10 out of the way so that it does not interfere with the normal operation of the motor vehicle.

Figure 2:
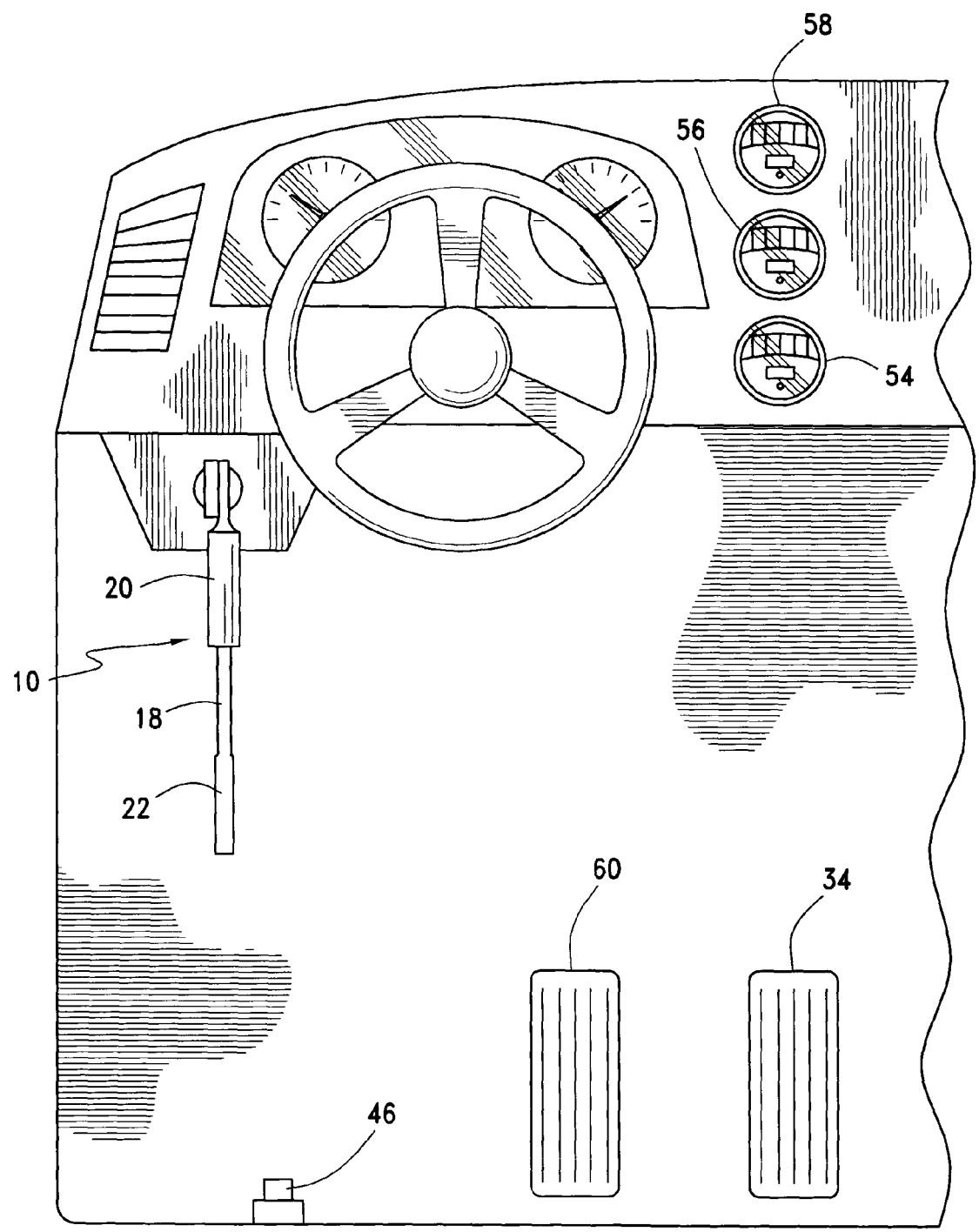
FIG. 2 is a schematic illustration of a control lay out for an automobile which includes an alternative fuel control device in accordance with the present invention.
Figure 3:
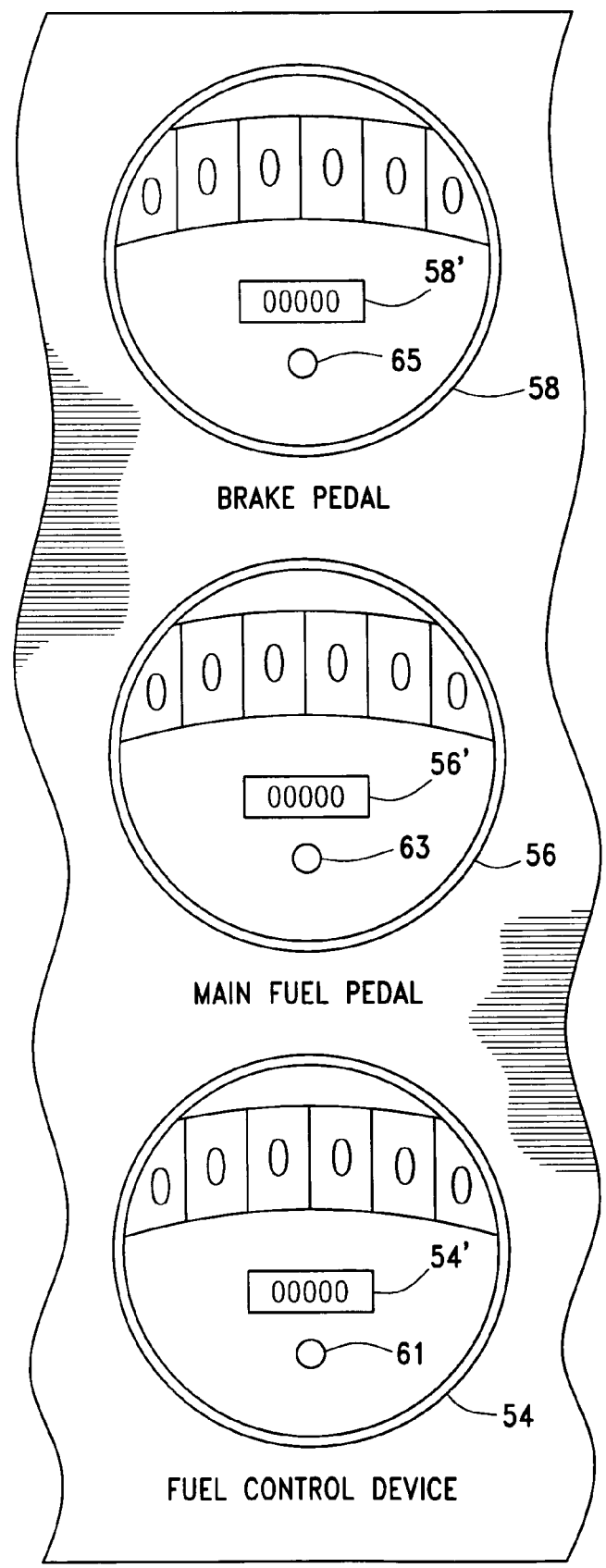
FIG. 3 is a front view of a plurality of meters for displaying data to a driver in accordance with the present invention.

As illustrated in FIGS. 2–4, a plurality of meters 54, 56 and 58 indicate the number of times that the auxiliary fuel control is used to increase the amount of fuel to the engine, the number of times that the conventional accelerator 34 is used and the number of times that a brake 60 is used. Each of the meters 54, 56 and 58 include a trip meter 54', 56' and 58' and reset buttons 61, 63 and 65 to set the trip meters to zero in a conventional manner.

Referring now to FIG. 4, the first signal generator 28 generates an electrical signal in response to a mechanical input to the servo motor 30 by means of a wire 32 and at the same time sends a signal to the meter 54 by means of a wire 53. This signal indicates an increase in fuel in response to the auxiliary fuel control 10. The second signal generator 40 generates an electrical signal in response to the mechanical input from a conventional accelerator pedal and sends the electrical signal to the servo motor 30 to increase the speed of the vehicle. At the same time a signal is sent to the meter 56 by means of a wire 55 as an indication of the number of times in a preselected time or a distance that the speed is increased by the accelerator pedal 34.

A signal is also generated by a brake indicator 59 by means of a wire 57 as an indication of the number of times that the brake pedal 60 is used over the same preselected period of time or distance. Comparison of the data generated can then be used as an indication of a erratic or smooth driving techniques, to eliminate excessive use of the accelerator and brake and as a further indicator of wear on the vehicle.

As shown in FIG. 4, a second servo 48 is activated by the foot switch 46 to move the auxiliary fuel control device 10 into engagement with the leg of the driver.

While the invention has been described in connection with its preferred embodiments, it should be recognized the changes and modifications may be made therein without departing from the scope of the appended claims.

What is claimed is:

1. A speed control device and counter for a motor vehicle comprising:

a first control member moveable between an activated and an inactivated position for contacting a portion of an individual's leg when the individual is seated in a motor vehicle in a driving position and said first member is in its activated position;

foot activated means for bringing said first control member into contact with the leg of an individual driver;

means for adjusting the position of the first member to engage the calf, knee or thigh of the individual driver;

means for increasing and decreasing the flow of fuel in response to lateral movement of said first member;

a counter for indicating the number of times the flow of fuel has been increased in response to the lateral movement of said first control member;

a second foot actuated fuel control member for increasing and decreasing the flow of fuel in response to foot pressure thereon; and a counter for indicating the number of times the flow of fuel has been increased by said second foot activated fuel control member.

2. A speed control device and counter for a motor vehicle according to claim 1, which includes a third counter for indicating the number of times a brake pedal of a motor vehicle has been depressed.

3. A speed control device and counter for a motor vehicle according to claim 2, in which said means for adjusting the position of the first control member is mechanical.

4. A speed control device and counter for a motor vehicle according to claim 3, in which each of said counters include a means for resetting one of said counters.

5. A drive-by-wire speed control and counter for a motor vehicle comprising:
- a first speed control member moveable between an activated and inactivated position for contacting a portion of an individual's leg when the individual is seated behind a steering wheel of a motor vehicle and said first control member is in an activated position;
- activating means including a first servo controller for bringing said first speed control member into contact with the leg of an individual;
- means for adjusting the position of the first speed control member to engage the calf, knee or thigh of the individual;
- means including a second servo controller for increasing and decreasing the flow of fuel in response to lateral movement of said first speed control member;
- a counter for indicating the number of times the flow of fuel is increased in response to the lateral movement of said first speed control member;
- a second foot actuated fuel control member and a third servo controller for increasing and decreasing the flow of fuel in response to foot pressure;
- a counter for indicating the number of times the flow of fuel is increased by said second foot operated control means;
- a brake pedal for actuating brakes in the motor vehicle and a counter for indicating the number of times that the brake pedal is depressed over a selected period of time or distance whereby the number of times a brake, foot activated fuel control and first speed control are used over a preselected time or distance may be used in analyzing an individual's driving habits.

* * * * *